US012780480B2

(12) United States Patent
Scherl et al.

(10) Patent No.: US 12,780,480 B2
(45) Date of Patent: Nov. 3, 2026

(54) METHOD FOR PRODUCTION MONITORING OF A LABELING MACHINE, AND LABELING MACHINE FOR LABELING CONTAINERS

(71) Applicant: Krones AG, Neutraubling (DE)

(72) Inventors: Stefan Scherl, Bernhardswald (DE); Bernhard Domeier, Pentling (DE); Veronika Tesar, Bischofsmais (DE); Andreas Ketterl, Wiesent (DE); Andreas Kraus, Lappersdorf (DE)

(73) Assignee: KRONES AG, Neutraubling (DE)

( * ) Notice: Subject to any disclaimer, the term of this patent is extended or adjusted under 35 U.S.C. 154(b) by 183 days.

(21) Appl. No.: 18/461,438

(22) Filed: Sep. 5, 2023

(65) Prior Publication Data

US 2024/0092523 A1 Mar. 21, 2024

(30) Foreign Application Priority Data

Sep. 9, 2022 (DE) ..................... 10 2022 123 055.4

(51) Int. Cl.
*B32B 41/00* (2006.01)
*B65C 9/02* (2006.01)
(Continued)

(52) U.S. Cl.
CPC .................. *B65C 9/40* (2013.01); *B65C 9/02* (2013.01); *B65C 9/18* (2013.01); *B65C 9/22* (2013.01);
(Continued)

(58) Field of Classification Search
CPC .... B65C 9/40; B65C 9/02; B65C 9/18; B65C 9/22; B65C 9/42; B65C 9/12; G01F 23/292; G01F 23/296
(Continued)

(56) References Cited

U.S. PATENT DOCUMENTS

| | | | | |
|---|---|---|---|---|
| 2010/0300599 | A1* | 12/2010 | Fort | B65C 9/2217 156/60 |
| 2018/0186497 | A1* | 7/2018 | Kasarin | B67C 3/007 |
| 2019/0127104 | A1 | 5/2019 | Gertlowski et al. | |

FOREIGN PATENT DOCUMENTS

| | | | |
|---|---|---|---|
| CN | 103043356 | A | 4/2013 |
| CN | 108137185 | A | 6/2018 |

(Continued)

OTHER PUBLICATIONS

European Patent Office, Extended European Search Report Issued in Application No. 23184043.0, Feb. 13, 2024, Germany, 17 pages.

(Continued)

*Primary Examiner* — Michael N Orlando
*Assistant Examiner* — Joshel Rivera
(74) *Attorney, Agent, or Firm* — McCoy Russell LLP

(57) ABSTRACT

A method for the production monitoring of a labeling machine, and a labeling machine for labeling containers, comprising a transport means for continuously supplying the containers, at least one labeling assembly for transferring labels to the containers, and at least one glue reservoir unit for continuously supplying glue for fastening the labels to the containers, is described. Accordingly, the filling state of the glue reservoir unit and a machine performance of the transport means and/or of the labeling assembly are continuously measured and, on this basis, at least one remaining running time is calculated, which indicates how long labeling can still be carried out, at the filling state, in the case of an assumed further course of machine performance. The output of the remaining running time facilitates continuous production planning and enables efficient personnel use for the required replenishment of consumables.

10 Claims, 2 Drawing Sheets

(51) Int. Cl.

| | |
|---|---|
| ***B65C 9/18*** | (2006.01) |
| ***B65C 9/22*** | (2006.01) |
| ***B65C 9/40*** | (2006.01) |
| ***G01F 23/292*** | (2006.01) |
| ***G01F 23/296*** | (2022.01) |
| *B65C 9/00* | (2006.01) |

(52) U.S. Cl.
CPC .......... *G01F 23/292* (2013.01); *G01F 23/296* (2013.01); *B65C 2009/0071* (2013.01)

(58) Field of Classification Search
USPC .................... 156/60, 64, 350, 351, 378, 379
See application file for complete search history.

(56) References Cited

FOREIGN PATENT DOCUMENTS

| | | | |
|---|---|---|---|
| CN | 210126700 | U | 3/2020 |
| DE | 102008049830 | A1 | 4/2010 |
| EP | 3483080 | A1 | 5/2019 |
| EP | 3486185 | A1 | 5/2019 |
| KR | 20150094357 | A | 8/2015 |
| WO | 2010018224 | A1 | 2/2010 |

OTHER PUBLICATIONS

State Intellectual Property Office of the People's Republic of China, Search Report Issued in Application No. 202311133660.2, Jan. 16, 2026, 4 pages. (Submitted with English Translation).

* cited by examiner

METHOD FOR PRODUCTION MONITORING OF A LABELING MACHINE, AND LABELING MACHINE FOR LABELING CONTAINERS

CROSS REFERENCE TO RELATED APPLICATION

The present application claims priority to German Patent Application No. 10 2022 123 055.4 filed on Sep. 9, 2022. The entire contents of the above-listed application are hereby incorporated by reference for all purposes.

TECHNICAL FIELD

The disclosure relates to a method for the production monitoring of a labeling machine, and to a labeling machine for labeling containers.

BACKGROUND

As is known, containers such as beverage bottles are in industry labeled in labeling machines, in that the containers are provided by a transportation means, for example a container carousel, continuously, i.e. in the form of a product stream, and labels from at least one labeling assembly are stuck onto the containers. There, the labels are provided continuously from at least one label store, for example singly as a stack or in an as yet unsingled form as label strips on rolls. For this purpose, the label store generally comprises interchangeable magazines for labels in sheet format or alternately operating unwinding devices for label strip rolls, optionally also comprising a roll magazine for the automatic replenishment and changing of label strip rolls.

SUMMARY

Furthermore, the labels are coated either with cold glue or hot glue in order to attach them to the containers. The glue is then either provided at room temperature in replaceable containers or melted in a permanently installed glue tank and drawn from there. The glue is known to be pumped in each case to a gluing unit which coats the labels. The glue supply is then monitored for example by monitoring a minimum fill level in the respective container/tank.

In order to avoid production interruptions, the need for glue replenishment in the label store must be recognized in good time. For this purpose, operators regularly check the glue reservoir unit on site, and/or warning messages are output when a certain reserve amount of glue is fallen below.

It is also known from DE 10 2008 049 830 A1 to determine glue consumption by repeated weighing of a glue container in production operation and to calculate a surface-area-specific glue consumption in the case of a known number of labels supplied with said glue. This can then be used to assess various production aspects and can be varied in a targeted manner for production optimization or correction of undesired setpoint deviations.

However, it is furthermore disadvantageous that, in filling plants for containers, usually a plurality of treatment machines and/or assemblies having associated consumables reservoir units for, for example, glue, labels, films, $CO_2$ or the like are to be monitored. It may then be the case that a plurality of signals/warning messages and operating steps triggered thereby coincide in time, and/or the respective available reaction times are unsatisfactory. This can cause production interruptions and undesirably high personnel requirements.

There is therefore a need for improved methods and apparatuses for production monitoring of a labeling machine.

The stated object is achieved by a method and by a device according as described herein.

The continuous output of a predicted remaining running time facilitates continuous production planning and enables efficient personnel use for the required replenishment of consumables.

Simultaneous monitoring of at least two consumables, in particular on a plurality of labeling assemblies of the labeling machine, for example the respective label supply and glue supply, is particularly advantageous.

It can then be clearly displayed, for example, which consumable should be refilled first. It is also possible to estimate when this will be necessary and whether a plurality of operator interventions for the replenishment of consumables may possibly overlap in time.

This is made possible by continuous gradual monitoring of at least one consumable supply that is continuously available in the labeling machine, in contrast to merely monitoring whether a reserve threshold has been fallen below. In this way, time profiles of the filling states of the respective consumables storage unit can be determined, and it is possible to predict on this basis when the supply of a specific consumable, which can be drawn off in each case by machine/automatically at the respective unit, is exhausted during production at a particular machine performance.

The described continuous or ongoing processes such as measurement, calculation and data output should be understood to mean that these are regularly repeated in the sense of continuous or quasi-continuous monitoring, for example in contrast to random sampling, and in particular require no interruption/slowing down of the production process.

In order to determine the filling state of the glue reservoir unit, the fill level of the glue (hot glue) is preferably measured continuously by means of a capacitive sensor in a glue tank which holds the glue in molten form and is permanently attached. Alternatively, it is possible to continuously measure the fill level of the glue (cold glue), in a glue container that is inserted into the glue reservoir unit for drawing off glue continuously, measuring in a continuous and contactless manner by means of a distance sensor. In particular, the filling state is then continuously calculated on the basis of a stored cross-sectional profile of the glue container used and the fill level measured therein.

However, determination of the filling state can also be based on other measuring methods, for example on the ongoing weighing of the glue tank/glue container, internal camera monitoring, downstream flow measurement, and/or ongoing fill level measurement by means of floats or the like.

Furthermore, a specific glue consumption, in particular per label or per unit area, can be calculated on the basis of a decrease in the fill level in the glue reservoir unit measured over a sliding production period, and the average machine performance averaged over the production period and output in a manner continuously updated on the basis of the sliding measurement and averaging.

Such a determination of glue consumption requires only a relatively low outlay in terms of apparatus and is particularly suitable for relatively slow or time-averaging monitoring of the glue consumption.

In principle, however, it would also be conceivable to determine the glue consumption directly at the coated label by means of camera monitoring. This is also possible in principle by means of glue flow measurement in the labeling assembly or glue thickness measurements at the label, for example by measuring the conductivity of the label. Although such a determination of the glue consumption is more complex in terms of apparatus, it does enable speedier and possibly also more accurate or less error-prone monitoring of the glue consumption than fill level measurement.

If the specific glue consumption determined in each case leaves a target range (good window) prespecified therefor, a warning message or error messages can be output and/or a machine response can be triggered automatically, for example stopping the labeling machine or the automatic readjustment thereof.

BRIEF DESCRIPTION OF THE FIGURES

A preferred embodiment of the disclosure is illustrated in the drawings, in which.

DETAILED DESCRIPTION

Figure 1:
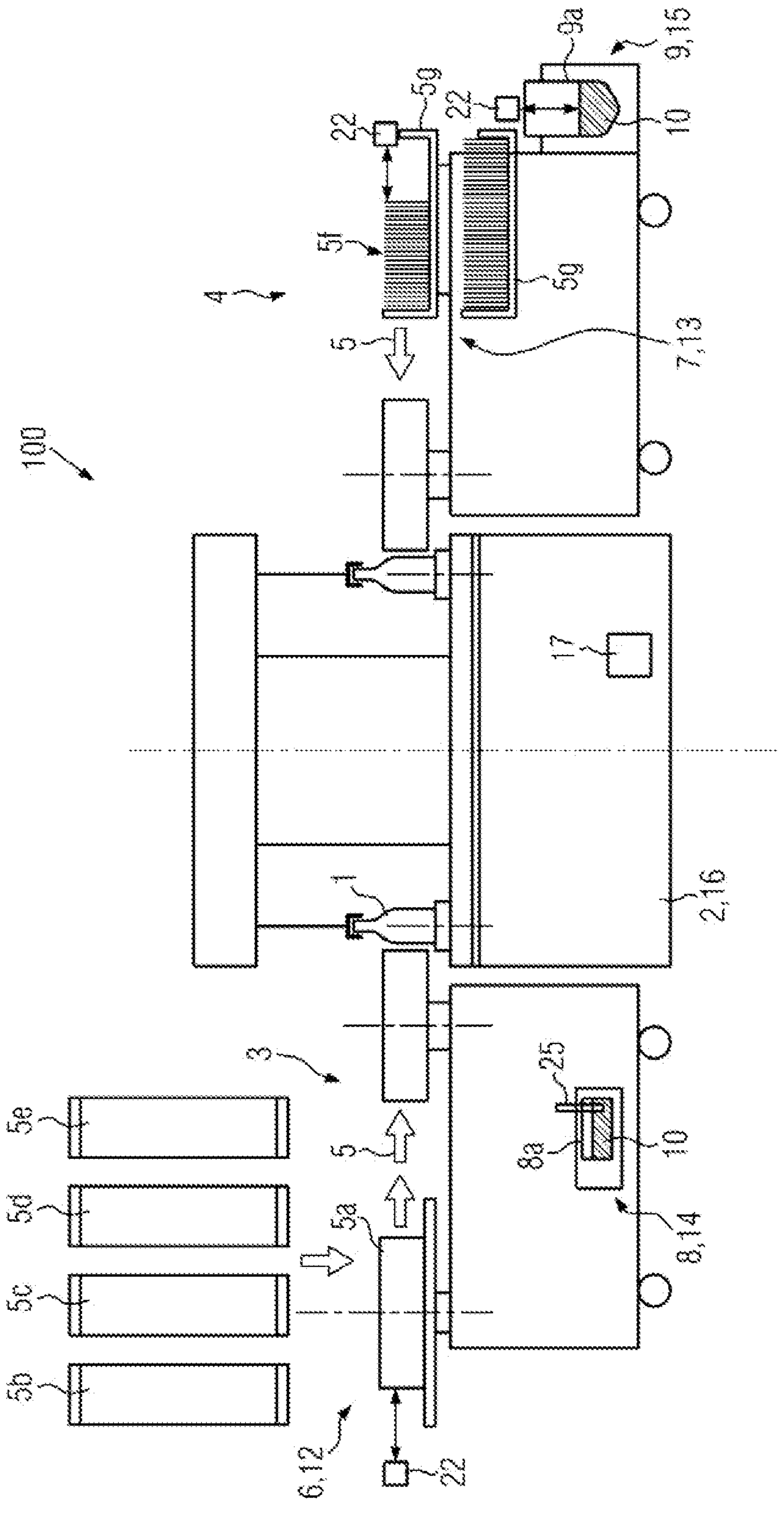
FIG. 1 is a schematic view of the labeling machine and the monitoring system.
Figure 2:
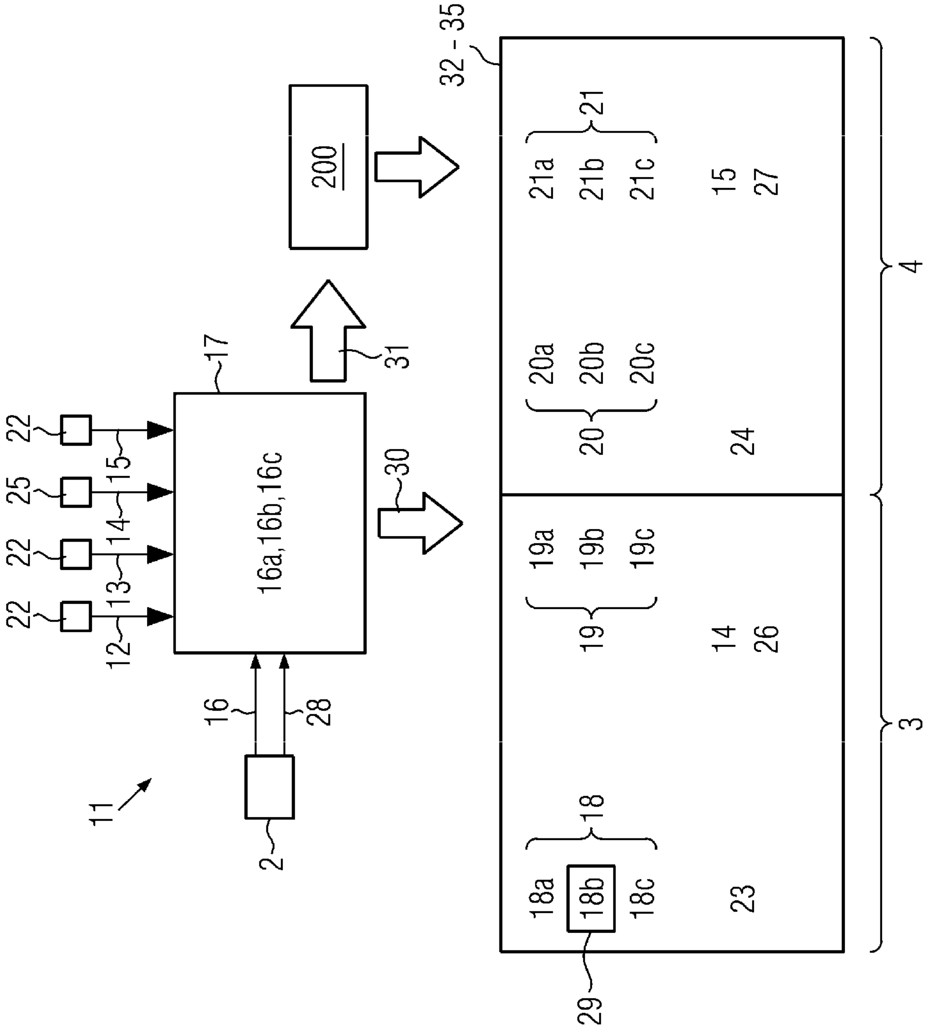
FIG. 2 is a schematic illustration showing data streams and data output.

As can be seen from FIGS. 1 and 2, the labeling machine 100 to be monitored for labeling containers 1, for example glass bottles, plastic bottles, pulp bottles, metal cans, plastic cups or the like, comprises a transport means 2, preferably designed as a carousel, for continuously providing the containers 1 in the sense of a continuous product stream, and at least one labeling assembly 3, 4—arranged/docked on the periphery of the transport means 2—for attaching labels 5 to the containers 1.

For this purpose, the transport means 2 comprises rotary mountings known in principle (indicated only schematically) for the containers 1, in order to position them suitably during labeling.

By way of example, merely for better understanding, here a first labeling assembly 3 is shown as a hot-glue assembly, and a second labeling assembly 4 as a cold-glue assembly on the same labeling machine 100.

The first labeling assembly 3 comprises, for example, a first label store 6 for the continuous provision of the labels 5 for transfer thereof to the containers 1, while the second labeling assembly comprises, for example, a correspondingly functioning second label store 7.

Furthermore, for example, a first glue reservoir unit 8 is assigned to the first labeling assembly 3 for the continuous provision of glue 10, which is applied to the labels 5 in the first labeling assembly 3 for fastening said labels to the containers 1. A correspondingly functioning second glue reservoir unit 9 is assigned to the second labeling assembly 4, for example.

The first label store 6 provides the labels 5 continuously, for example, in a connected manner in the form of label rolls 5*a*-5*e*. The labels 5 are then singled in the first labeling assembly 3 in a manner known in principle.

The first label store 6 can be integrated into the first labeling assembly 3, for example in a known manner with two label rolls 5*a*, 5*b* running alternately side-by-side (only shown for the label roll 5*a*). Alternatively, the first label store 6 can be designed as a separate roll changer (a so-called multi-reel system) comprising a plurality of label rolls 5*a*-5*e* that are held therein and can be automatically replaced, and can be connected to the first labeling assembly 3 (indicated only schematically) via a buffer section for the wound-off label strips (indicated only schematically).

The first glue reservoir unit 8 comprises, for example, a glue tank 8*a* in which the glue 10 is present in molten form. For this purpose, the glue tank 8*a* can comprise, for example, a separate drawing-off chamber for the molten glue 10 and an upstream melting and storage chamber (not shown).

The second label store 7 provides the labels 5, for example individually in the form of label stacks 5*f* in replaceable storage containers 5*g*, such as cassettes or troughs, for continuous label removal.

The associated glue 10 is then stored, for example, in a glue container 9*a*, for example a glue bucket, which can be replaceably inserted into the second glue reservoir unit 9, at room temperature, for the continuous removal which is known in principle.

The glue reservoir units 8, 9 are integrated into the labeling assemblies 3, 4 via lines and pumps (not shown) in a manner that is known in principle.

The common representation of the hot-glue assembly and cold-glue assembly and of different types of label stores 6, 7 and glue reservoir units 8, 9 serves here merely for better understanding of the described quantitative monitoring of consumables in the labeling, here the labels 5 and the glue 10.

For this purpose, the labeling machine 100 comprises an electronic monitoring system 11. This serves for production monitoring by means of continuous measurement of a respective current filling state 12, 13 of the first and/or second label stores 6, 7 and a respective current filling state 14, 15 of the first and/or second glue reservoir units 8, 9. The monitoring system 11 is further designed for the ongoing measurement and/or evaluation of a current machine performance 16 or transport speed of the transport means 2, of the first labeling assembly 3 and/or of the second labeling assembly 4. The machine performance 16 can be captured in a manner known in principle by drive monitoring in the labeling machine 100, and transmitted to the monitoring system 11.

For this purpose, the monitoring system 11 comprises an electronic evaluation unit 17, which is programmed to calculate and output, on the basis of the captured machine performance 16 and the filling states 12, 13, 14, 15, a remaining running time 18, 19, 20, 21 of the first and second labeling assemblies 3, 4 in the sense of a respective maximum remaining production duration, which remaining running time is expected to be possible, in each case, with the labels 5 and the glue 10.

The remaining running times 18-21 are each assembly-specific, consumable-specific and performance-specific.

The evaluation unit 17 is integrated into the labeling machine 100. However, individual steps of the described evaluation steps can be outsourced at least in part, for example to a computing unit which is part of a cross-machine monitoring system 200 (known as a watchdog) and is then connected to the labeling machine 100, in a manner known in principle, for data exchange.

An output of the remaining running time 18, 19, 20, 21 is to be understood here to mean that at least one performance-specific forecast value 18*a*-18*c*, 19*a*-19*c*, 20*a*-20*c*, 21*a*-21*c* of the remaining running time 18-21, which is assigned in each case to a particular assumed further course 16*a*, 16*b*, 16*c* of the machine performance 16, for the respective consumables—here the labels 5 and the glue 10—is displayed on the labeling machine 100 and/or is provided thereby in a suitable data format for external retrieval, for example by means of a smartphone or smartwatch.

First performance-specific forecast values 18*a*, 19*a*, 20*a*, 21*a* of the remaining running times 18-21 can be output, for example calculated for a maximum machine performance 16, i.e. a first further profile 16*a*. Corresponding second performance-specific forecast values 18*b*, 19*b*, 20*b*, 21*b* can, for example, be calculated and output for a respective current machine performance 16, i.e. a second further profile 16*b*. Corresponding third performance-specific forecast values 18*c*, 19*c*, 20*c*, 21*c* can be calculated and output for an average machine performance 16, i.e. a third further profile 16*c*. The last is preferably carried out on the basis of a moving average value of the measured machine performance 16, for example averaged over the last production hour in each case.

The filling state 12 of the first label store 6 can be determined, for example, by a distance sensor 22 operating in a contactless manner by means of ultrasound or laser light, in particular by measurement of the distance from the periphery of the label roll 5*a* used in each case. Alternatively or additionally, the distance sensor 22 can also be designed in the form of a camera, for example as a 3D camera, or can operate inductively or otherwise in an optically scanning manner. Optionally, the number of full label rolls 5*b*-5*e* available for automatic replenishment can also be determined. This is also possible, for example, in a contactless manner by means of ultrasound or also by means of laser detection (not shown).

From the measured current diameter of the label roll 5*a* used, in the case of a known label thickness and in the case of a known number of labels per full label roll 5*b*-5*e*, the remaining number 23 of labels 5 still available in each case without operator intervention on the first labeling assembly 3, can be determined and be used for the calculation of a first remaining running time 18 of the first labeling assembly 3. The label thickness can be continuously recalculated during the production process and is then always known as the current actual value.

Accordingly, the filling state 13 of the second label store 7 can be determined by a distance sensor 22 operating in a contactless manner, for example by means of ultrasound or laser light, in particular by measurement of the distance from the trailing end of the currently used label stack 5*f*.

Optionally, the number of full storage containers 5*g* available for automatic replenishment can also be determined. This is also possible in a contactless manner by means of ultrasound, inductive, imaging or other optical means, or also by means of laser detection (not shown).

From the measured current thickness of the label stack 5*f* used, the remaining number 24 of labels 5 still available in each case without operator intervention on the second labeling assembly 4, can be determined in the case of a known label thickness and in the case of a known number of labels per full storage container 5*f*, and be used for the calculation of a first remaining running time 20 of the second labeling assembly 4.

The label thickness used in the calculation of the remaining running times 18, 20 possible with the labels 5 can be specified as a sorting parameter, continuously measured and/or calculated on the basis of the ongoing label consumption.

The filling state 14 of the first glue reservoir unit 8 can be determined, for example, by a capacitively operating fill level sensor 25. Weighing cells and other types of sensors would also be conceivable for this purpose.

The filling state 15 of the second glue reservoir unit 9 can be determined, for example, by a distance sensor 22 operating in a contactless manner by means of ultrasound, in particular by measurement of the distance from the surface of the glue 10 present underneath.

The contactlessly operating distance sensors 22 and the capacitive fill level sensor 25 are part of the monitoring system 11 described.

In the case of a known specific glue consumption 26, 27, for example per label 5, the total number of labels 5 which can be processed in each case using the glue 10, without operator intervention, can be determined from the current filling state 14, 15 and the amount of glue corresponding thereto and be used for the calculation of a second remaining running time 19 of the first labeling assembly 3 and a second remaining running time 21 of the second labeling assembly 4.

The specific glue consumption 26, 27 can be prespecified at the beginning of production in each case, and calculated during ongoing production by monitoring the filling states 14, 15, and updated and/or averaged thereby. As is known, the specific glue consumption 26, 27 can also be specified per unit area.

Both the respective first remaining running time 18, 19 relating to the associated label supply and the respective second remaining running time 20, 21 relating to the associated glue supply can then be output or displayed for the labeling assemblies 3, 4, or only the respective shorter remaining running time 18-21. This indication takes place in principle in the form of at least one performance-specific forecast value 18*a*-18*c*, 19*a*-19*c*, 20*a*-20*c*, 21*a*-21*c*, that is to say for corresponding assumed further profiles 16*a*-16*c* of the machine performance.

FIG. 2 illustrates, by way of example and schematically, the processing of measured values of the filling states 12-15 and of the machine performance 16 in the monitoring system 11, and the output, based thereon, of forecast remaining running times 18-21 of the labeling assemblies 3, 4, of filling states 14, 15 of the glue reservoir units 8, 9, of the total available remaining number 23, 24 of labels 5 in the label stores 6, 7 in each case, and of the specific glue consumption 26, 27, for example per label or area unit, in each case.

For this purpose, the evaluation unit 17 is programmed for calculating at least one remaining running time 18-21, in order to indicate how long labeling can still be carried out at the current filling state 12-15 and in the case of an assumed course, for example in the case of an average value of the machine performance 16.

Furthermore, the evaluation unit 17 can be programmed for the ongoing determination of a remaining quantity 28 of containers 1 still to be labeled. Based on this, the evaluation unit 17 can calculate a storage forecast 29 and output whether the filling states 12-15 are sufficient for labeling the remaining quantity 28.

For example, it is possible to display which consumable at which labeling assembly will be used up first. In the case of an imminent type change, it is possible to predict whether the consumables, in particular the labels 5, are still sufficient for the container type to be produced, whether corresponding replenishment is required, or whether it can already be loaded for the next or new type.

For this purpose, a remaining quantity 28 of containers 1 still to be labeled, in a manner typical for their type, can be continuously updated in a manner known in principle, and the storage forecast 29 can be calculated and output on this basis. This preferably indicates whether the filling state 12, 13 of individual label stores 6, 7 and optionally also the filling state 14, 15 of individual glue reservoir units 8, 9 is sufficient for labeling the remaining quantity 28.

The storage forecast 29 can be output, for example, by color marking of the respective display values, for example the remaining running times 18-21, and/or by separate information in the sense of a warning message and/or action recommendation.

The described output of measured values and/or calculated forecast values is possible both due to its localized display 30 on the labeling machine 100 and due to its data transmission 31 to a cross-machine monitoring system 200 for the digital location-independent monitoring of machine states (condition monitoring tool/so-called watchdog), which is provided independently of location, for example in a data cloud or on associated servers, in a manner that is known in principle.

The described output of measured and/or calculated values thus takes place in a data format which is suitably standardized for data exchange with display devices, for example touchscreens, and/or data storage devices.

The localized display 30 is possible, for example, on a touchscreen 32 or other screen assigned to the transport means 2 or to the base unit of the labeling machine 100, likewise on a touchscreen 33, 34 or other screen assigned to the labeling machine 100 as a whole (not shown) or to the first and/or second labeling assembly 3, 4.

In particular, a display on mobile terminals 35, for example on a smartphone or a smartwatch, is also possible via the cross-machine monitoring system 200. In principle, a display 30, which is localized in the above sense, on mobile terminals 35 would also be possible by the integration thereof into the labeling machine 100 by means of a locally restricted radio link.

The state and/or forecast data processed by the evaluation unit 17 as described can be continuously updated and thus transmitted flexibly to apps, smartwatches, watchdog systems or the like, and there continuously retrieved by operators. Likewise, warning messages when a certain storage reserve or the like is fallen below can be transmitted to smartwatches or smartphones and output automatically thereby.

FIG. 1 indicates that, for example, the first label store 6 can hold a plurality of label rolls 5$a$-5$e$, which are automatically and optionally selectively topped up for label replenishment. Systems of this kind, for example referred to as multi-reel systems, are usually connected by means of buffer sections for the wound-off label strips. For a change of type, the labels 5 of the new type can then already be run in advance through such buffer sections, so that the labels 5 of the new type are already available on the respective labeling assembly 3, 4 at the change of the type.

The described monitoring system 11 can be operated, for example, as follows:

When hot glue is processed, the filling state 14 (glue fill level) in the glue tank 8$a$ (optionally drawing-off chamber) of the glue reservoir unit 8 can be determined by means of a capacitive fill level sensor 25, and the filling state 12 in the associated label store 6 (label fill level) can be determined by means of ultrasound sensors. From this, the remaining running times 18, 19 for the labels 5 still present and for the glue 10 can be calculated in the case of at least one premised machine performance 16.

With a capacitive fill level sensor 25 in the respective glue tank 8$a$ (optionally in its drawing-off chamber), the fill level of the glue 10 can be measured/determined continuously. The associated remaining running time 19 can be calculated on the basis of the glue fill level thus detected, and preferably on the basis of an average machine performance 16. Forecast data relating to filling state 14 and remaining running time 19 are displayed, for example, on a touchscreen of the labeling machine 100. In addition, an updated calculation and display of the specific glue consumption 26, for example per label 5 and/or unit area, is possible.

If the first label store 6 is designed as an independent roll changer (multi-reel system) comprising a plurality of label rolls 5$a$-5$e$ and a buffer section to the labeling assembly 3, the filling state 12 preferably will comprise not only the currently used label roll 5$a$, optionally label rolls 5$b$-5$e$ available for automatic replenishment, but also the labels 5 present on the buffer section.

The associated remaining running time 18 can then also be output in the region of the multi-reel system. However, a display is advantageous in the region of the associated labeling assembly 3 together with the remaining running time 19 determined there for the associated glue 10 or on the base machine, that is to say in the region of the transport means 2, then preferably together with further remaining running times 20, 21, in particular all consumables and assemblies which are already used in this sense in the labeling machine 100.

For calculating and outputting the remaining running times 18-21 and/or filling states 12-15, the data required for this purpose can be exchanged for example via a DMM interface with a cross-machine monitoring system 200 for the digital location-independent monitoring of machine states (condition monitoring tool/watchdog).

The specific glue consumption 26, 27, in particular per label 5, could also be calculated as a result of a transmission of the filling state 14, 15 (glue fill level) by means of an algorithm in the digital monitoring system 200 (watchdog). For this purpose, additional data could be entered there, for example the surface area of the labels 5, the vertical cross-sectional profile of the glue reservoir unit 8, 9 and/or the density of the glue 10. In FIG. 1, the glue container 9$a$ used is shown for example having a cross-sectional profile tapering In the lower region, which promotes the most complete emptying possible.

Alternatively or additionally, however, the specific glue consumption 26, 27 can also be calculated in the respective assembly controller, for example in the first and/or second labeling assembly 3, 4, in the (superordinate) machine controller of the labeling machine 100, or in a separate control unit (on site), such as via instructions stored in memory of the controller and processed via a processor of the controller to carry out the various actions as described herein.

The specific glue consumption 26, 27 can then be monitored by means of configurable warning thresholds and alarm thresholds in the cross-machine monitoring system 200 (watchdog) and transmitted to suitable mobile terminals 35 and/or to at least one touchscreen 32-34 of the labeling machine 100 for display there. In a corresponding manner, operator tasks and/or action recommendations can also be output when threshold values are reached.

When cold glue is processed, the filling state 15 (glue fill level) in the glue container 9$a$ can be detected for example by means of an ultrasound sensor, the filling state 13 (label fill level) by means of laser distance sensors. The remaining running time 20, 21 described for the labels 5 and the glue 10 then again applies to at least one machine performance 16 that is premised for further production. The specific glue consumption 27 can again be calculated per label 5 and/or per unit area.

For example, a distance sensor 22 (laser distance sensor) then detects the thickness of the label stack 5*f* in the storage container 5*g* currently used for production. For each further storage container 5*g* that can additionally be inserted into the label store 7 for the automatic replenishment of labels 5, a further distance sensor 22 (for example laser distance sensor) is then preferably present in each case, in order to determine the number of filled storage containers 5*g* available and to take this into account when determining the filling state 13 (total fill level).

In order to detect the filling state 15 (glue quantity) and to determine the specific glue consumption 27, the fill level in the glue container 9*a* (glue bucket) can be measured by a vertically aligned ultrasound sensor. On the basis of a cross-sectional profile (shape) of the glue container 9*a* stored in the labeling assembly 4, the filling state 15, in the sense of a glue quantity, can be calculated from the measured fill level. Based on the number of labels 5 produced and the glue quantity (weight) used therefor, the specific glue consumption 27 can be calculated for example per label 5 and standardized per unit area.

It is then possible to display, for example: the current filling state 12, 13 (label fill level), for example as a relative value (%) and/or as an absolute value (number); a warning in the case of too low a fill level; an error message in the event of a defective fill level measurement; the current thickness of the label stack 5*f* or the current diameter of the label roll 5*a*; the measured and/or calculated label thickness; the number of full storage containers 5*g* (cassettes) or label rolls 5*b*-5*e*; remaining number of the labels 5 in the currently used storage container 5*g* (cassette) or on the currently used label roll 5*a*; remaining number 23, 24 of the labels 5; the machine performance 16 taken as the basis (for example on average over the last production hour); and/or the calculated forecast values 18*a*, 18*b*, 18*c*, 20*a*, 20*b*, 20*c* of the remaining running time 18, 20 at maximum, current and average machine performance 16.

It is then possible to display, for example: the current filling state 14, 15 (glue quantity), for example as a relative value (%) and/or as an absolute value (volume and/or weight); the current glue weight in the glue container 9*a*; the current glue volume in the glue tank 8*a* or glue container 9*a*; the current fill level (glue height) in the glue tank 8*a* or glue container 9*a*; the current specific glue consumption 26, 27, for example surface area-specific, time-specific and/or label-specific (per label 5 or per transfer element of the labeling assembly 4); measured average machine performance of the last production hour; and/or calculated forecast values 19*a*, 19*b*, 19*c*, 21*a*, 21*b*, 21*c* of the remaining running time 19, 21 at maximum, current and average machine performance 16.

Furthermore, an overview at a central touchscreen 32 of the labeling machine 100 is conceivable, comprising the most important information about the filling states 12-15 and/or the remaining running times 18-21, in particular for all consumables used in the labeling machine 100 and for all the labeling assemblies 3, 4 operated therewith.

In this case, it is particularly advantageous to show which consumable has to be refilled next by operator intervention.

The described measured values and forecast data can be transferred to a data cloud and retrieved there and displayed by mobile terminals 35.

In particular in connection with a cross-machine monitoring system 200, it is possible to freely configure warning messages and/or action instructions for certain filling states 12-15 and to output them automatically when corresponding threshold values are reached, for example when minimum filling states are reached and/or it is necessary to top up labels 5 within a certain period of time.

In particular in connection with a cross-machine monitoring system 200, it is possible to configure error messages and/or control actions freely in advance and to output them automatically when corresponding threshold values or states are reached, for example determination that a glue container 9*a* is empty and/or of the need to close a bottle lock. In a corresponding manner, a good window in the sense of a target range can be defined for the specific glue consumption 26, 27 and, in the event of departure from the good window, a warning message and/or an error message can be output and a machine action triggered.

Furthermore, the current quality of the glue consumption calculation can be determined and output. If only a few labels 5 have been processed, the calculation of the specific glue consumption 26, 27 will still be relatively inaccurate, associated warning messages may not yet have been required to be output, and/or associated machine actions may not yet have been required to be triggered. Display values can be provided with an indication of low quality.

The calculation and monitoring of the specific glue consumption 26, 27 can take place both in the labeling machine 100 and in the cross-machine monitoring system 200 (cloud, watchdog).

Furthermore, it is possible to output information regarding whether the respective consumable (labels 5, glue 10) is sufficient for the remaining planned production, or how much, if necessary, is additionally required.

In order to determine accurately the current volumetric filling state 15 in a glue container 9*a*, in the described manner, the shape of the glue container 9*a* used is preferably parametrized in the labeling machine 100 or in the labeling assembly 4, for example the vertical profile of the inner diameter of the respective glue container 9*a*. For this purpose, different glue containers 9*a* can be defined as type parameters. As a result, for example, glue containers 9*a* of different manufacturers together with the associated cross-sectional profile can be selected by the user and taken into account automatically in the calculation described.

In principle, certain measured fill levels could also be assigned filling states 15 typical of type, in the sense of respective remaining glue quantities on the basis of empirical values determined and stored in a manner typical of type, which were previously obtained in test runs and/or production runs using the format of the glue container 9*a* currently used for production.

In order to determine the label thickness used for the calculation, the evaluation unit 17 can initially draw on target values/manufacturer's values or similar default values. In the further production process, the actual label thickness is preferably calculated from the label consumption and the change of the measured roller diameters or stack thicknesses.

For the sake of clarity, the above description of the method and the labeling machine 100 is based on two different labeling assemblies 3, 4. It is understood that the number of labeling assemblies used can differ therefrom and/or that, as a rule, labeling assemblies 3, 4 of the same type are arranged in the labeling machine 100.

The invention claimed is:

1. Method for a production monitoring of a labeling machine, which comprises a container carousel for continuously supplying containers, at least one labeling assembly for transferring labels to the containers, and at least one glue reservoir unit for continuously supplying glue for fastening the labels to the containers, wherein a filling state of the at least one glue reservoir unit is continuously measured and a machine performance of the container carousel and/or of the at least one labeling assembly is continuously measured and, on this basis, at least one remaining running time is calculated and output, which indicates how long labeling can still be carried out, at the filling state, in the case of an assumed further course of machine performance, wherein a specific glue consumption per label or per unit area is calculated on the basis of a decrease in a fill level of the glue in the at least one glue reservoir unit measured over a sliding production period and the average machine performance averaged over the production period, and is continuously updated on the basis of the sliding measurement and averaging, and wherein for determining the filling state of the at least one glue reservoir unit:

a fill level of the glue in a glue tank which receives said glue in molten form and is permanently fastened is measured continuously via a capacitive sensor and/or a filling state of the glue tank is determined by at least one weighing cell;

or the fill level of the glue in a glue container which is inserted into the at least one glue reservoir unit for a continuous drawing-off of glue is continuously measured in a contactless manner by means of a distance sensor, and the filling state is continuously calculated on the basis of a stored cross-sectional profile of the at least one glue reservoir unit and the fill level measured therein.

2. Method according to claim 1, wherein the filling state of at least one label store for the continuous provision of the labels for the transfer thereof to the containers is continuously measured, and at least one associated remaining running time is calculated and output, which indicates how long labeling can still be carried out, at the filling state of the label store, in the case of the assumed further course of machine performance.

3. Method according to claim 2, wherein it is further calculated and output which of the label store of label stores and the at least one glue reservoir unit has the shortest remaining running time and/or must be refilled first.

4. Method according to claim 1, wherein a remaining quantity of containers, which is still to be labeled in a manner typical of type, is furthermore continuously determined, and on this basis a supply forecast is calculated and output, which indicates whether the filling state is sufficient for labeling the remaining quantity.

5. Method according to claim 1, wherein the output of at least the remaining running time takes place by its localized display on the labeling machine to a cross-machine monitoring system for a digital location-independent monitoring of machine states, including data transmission and display on mobile terminals.

6. Method according to claim 1, wherein at least the remaining running times for all labeling assemblies running on the labeling machine are displayed on a central touchscreen assigned to the container carousel or on another centrally assigned screen.

7. Labeling machine for labeling containers, comprising: a container carousel for continuously supplying the containers; at least one labeling assembly for applying labels to the containers; and at least one glue reservoir unit for continuously supplying glue for attaching the labels to the containers; and a monitoring system for production monitoring of the labeling machine, wherein the monitoring system is designed for ongoing measurement of a filling state of the at least one glue reservoir unit and for the ongoing measurement of a machine performance of the container carousel and/or of the labeling assembly, and is programmed for calculating and outputting at least one associated remaining running time based thereon, in order to indicate how long labeling can still be carried out, at the filling state, in the case of an assumed further course of machine performance, and wherein the monitoring system is further designed for: calculating a specific glue consumption per label or per unit area on the basis of a decrease in a fill level of the glue in the at least one glue reservoir unit measured over a sliding production period and the average machine performance averaged over the production period; and continuously updating the calculated specific glue consumption on the basis of the sliding measurement and averaging, wherein the at least one glue reservoir unit comprises: a capacitive sensor for fill level measurement in a glue tank for drawing-off molten glue, and/or at least one weighing cell for determining a filling state of the glue tank;

or wherein the at least one glue reservoir unit comprises a distance sensor, which operates contactlessly via ultrasound or laser light, for measuring a fill level in a glue container which can be replaced for glue replenishment, wherein the monitoring system is designed for storing and/or for retrieval of type-typical cross-sectional profiles of glue containers, in order to calculate the filling state on the basis of the cross-sectional profile of the glue container used and the fill level measured therein.

8. Labeling machine according to claim 7, further comprising at least one label store for supplying the labels to the containers to be transferred to the containers, wherein the monitoring system is further designed for ongoing measurement of a filling state of a label store and is programmed for calculating and outputting at least one associated remaining production duration based thereon, in order to indicate how long one can still label with the filling state of the label store at the assumed further course of machine performance.

9. Labeling machine according to either claim 7, wherein the monitoring system is further designed to determine a remaining quantity of containers still to be labeled, and is programmed to calculate and output a storage forecast on this basis, which indicates whether a filling state is sufficient for labeling the remaining quantity.

10. Labeling machine according to claim 7, wherein the labeling machine comprises at least one touchscreen for a localized display of at least the remaining running time, and/or the monitoring system is designed for data transmission at least of the remaining running time to a cross-machine monitoring system for digital location-independent monitoring of machine states.

* * * * *